United States Patent [19]
Lundeen et al.

[11] Patent Number: 5,139,335
[45] Date of Patent: Aug. 18, 1992

[54] HOLOGRAPHIC GRATING IMAGING SPECTROMETER

[75] Inventors: Thomas F. Lundeen; Jonathan C. Gradie, Both of Honolulu, Hi.

[73] Assignee: Sets, Inc., Mililani, Hi.

[21] Appl. No.: 571,716

[22] Filed: Aug. 24, 1990

[51] Int. Cl.$^5$ ................................. G01J 3/28
[52] U.S. Cl. .................................... 356/328
[58] Field of Search .............. 356/305, 307, 331, 332, 356/334, 326, 328, 324, 333, 416, 419; 250/339

[56] References Cited

U.S. PATENT DOCUMENTS

| | | | |
|---|---|---|---|
| 4,730,922 | 3/1988 | Bach et al. | 356/73 |
| 4,822,998 | 4/1989 | Yokota et al. | 250/226 |
| 4,997,281 | 3/1991 | Stark | 350/339 |

OTHER PUBLICATIONS

Sweedler et al., "High ... Device Detectors", Analytical Chemistry, vol. 60, #4, Jan. 15, 1988, pp. 289–291.

Primary Examiner—F. L. Evans
Assistant Examiner—K. P. Hantis
Attorney, Agent, or Firm—Paul J. Cook

[57] ABSTRACT

A spectrometer apparatus is provided including means for focusing a light beam with a concave holographic grating, means for passing light reflected from the grating through a step order filter to an array detector and means for processing signals from the array detector. The spectrometer permits monitoring a plurality of grating orders simultanously without mechanical scanning.

2 Claims, 2 Drawing Sheets

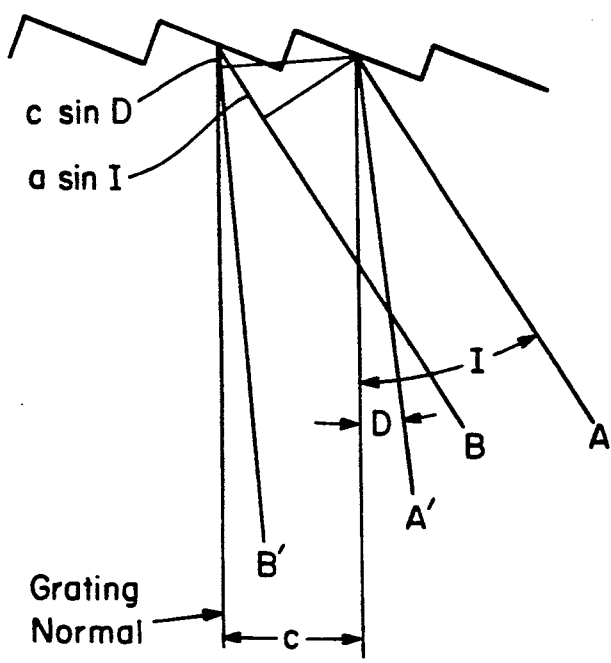
*Fig. 4*
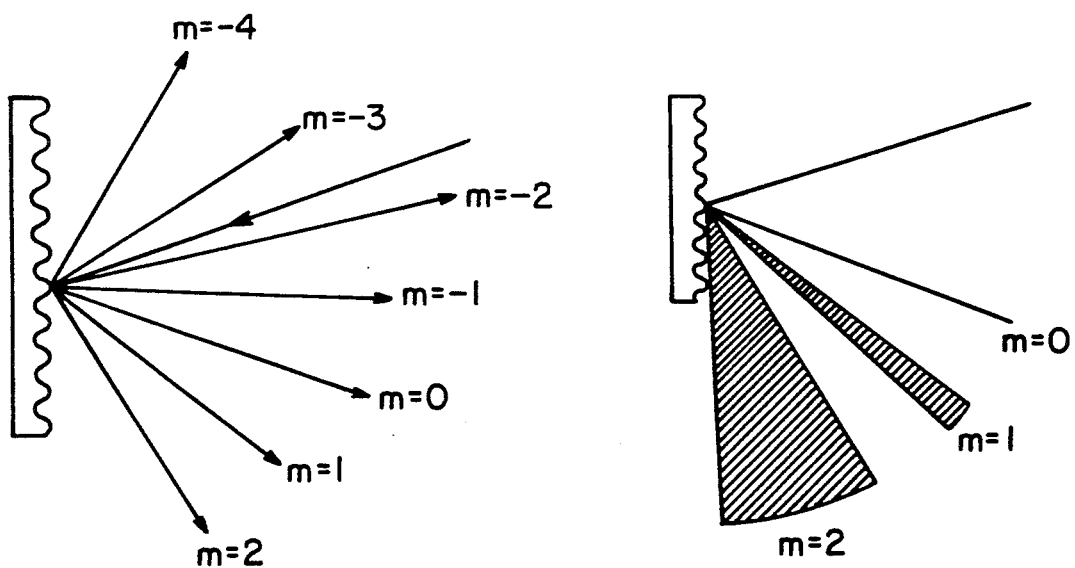
*Fig. 5*
*Fig. 6*

HOLOGRAPHIC GRATING IMAGING SPECTROMETER

BACKGROUND OF THE INVENTION

This invention relates to a spectrometer apparatus and more particularly to a spectrometer apparatus which includes a holographic grating and a step order sorting filter.

Prior to the present invention, spectrometers useful in spectrum and spectrochemical analysis have been available. The prisms or flat gratings which have been utilized in spectrometers largely have been replaced with concave holographic gratings which permit collimating and refocusing a light beam at the same time while eliminating aberration in the focus. A concave holographic grating is a grating formed on a concave mirror that contains a large number of closely spaced grooves formed by exposing a photoresist with light from a laser source.

Depending upon the ratio of incident light wavelength to groove spacing, there may be one or a large number of directions in which a light from each groove interferes constructively with that of the other grooves. The number of such directions comprises the number of grating orders. In order to sample more than one order of the grating, it is necessary to scan the spectrometer by moving the grating or detector in the spectrometer or to take a multiplicity of exposures using a standard order sorting filter.

Accordingly, it would be desirable to provide a spectrometer which permits monitoring a plurality of grating orders simultaneously without the need for mechanical scanning.

SUMMARY OF THE INVENTION

This invention provides a compact spectrometer which is capable of monitoring a plurality of grating orders simultaneously. The spectrometer comprises a housing containing an astigmatic concave holographic grating, a one or two-dimensional array detector and a step order sorting filter Positioned between the grating and detector. Means are Provided for introducing a light beam into the housing onto the grating which then reflects light through the filter onto the detector. The use of a step order sorting filter in conjunction with the other spectrometer components permits multiplexed sampling over large wavelength ranges with a high optical efficiency within a compact volume and without the need for mechanical scanning.

BRIEF DESCRIPTION OF THE DRAWINGS

FIG. 4 illustrates the grating equation.

FIG. 5 illustrates the grating order for monochromatic light.

FIG. 6 illustrates the grating order for polychromatic light and non overlapping orders, i.e., $$n_s\lambda_s \neq n_i\lambda_i$$

DESCRIPTION OF SPECIFIC EMBODIMENTS

Figure 1:
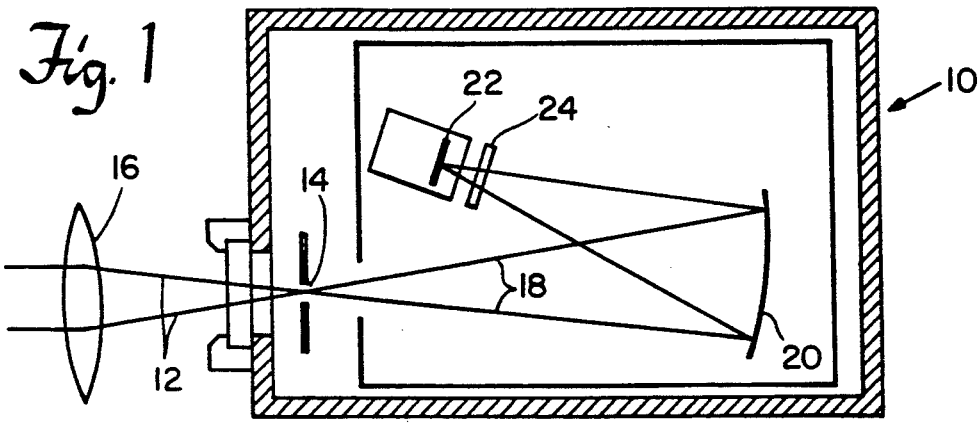
FIG. 1 is a top schematic view of the spectrometer of this invention.

In accordance with this invention, a spectrometer 10 is Provided which includes an aperture 14 through which a light beam 12 passes after being focused by fore-optics 16. The light beam 12 can originate from any artificial or natural source such as a chemical sample or an astronomical body. The light beam 18 passes from aperture 14 and is focused on grating 20. The grating 20 may be a conventional reflective type holographic grating that disperses the light to a plurality of detector elements in one or two dimensional array detector 22 after being passed through linear step order sorting filter 24. The electrical output of each element of the detector 22 is directed to a signal processing unit 26 which samples the output from each of the elements of the array detector, amplifies and then stores the several outputs.

In a preferred embodiment of the invention the array detector 22 comprises an array between $128 \times 128$ and $256 \times 256$ detector elements and may be an Hg Cd Te (mercury cadmium telluride array) grown on a sapphire substrate, for example. The grating 20 is a curved grating having a nominal radius of about 100 mm. The dispersion, determined by the groove spacing on the grating is nominally 200 nm/mm on detector 22. If desired, the grating may be ion etched to enhance any particular region of the spectrum as desired. Ion etching of a grating groove profile permits concentration of the diffracted light into a given order which, normally is one of the first orders. The curved holographic grating is formed from essentially error-free grooves on a curved surface which eliminates ghosts or spurious lines of detectable intensity. The curved holographic grating has the capability of focusing the dispersed light onto a flat image plane which permits the use of a flat multielement detector in two dimensions of this plane. The holographic gratings are sufficiently Precise that aberrations of the projected image of a source slit are negligibly small in normal spectrometer operation both in the Rowland circle plane as well as normal to this plane.

Figure 2:
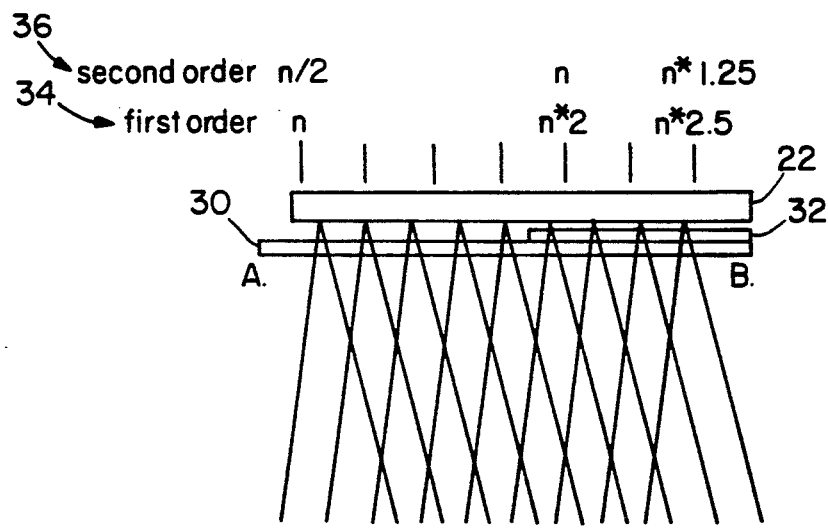
FIG. 2 represents the function of the step filters.
Figure 3:
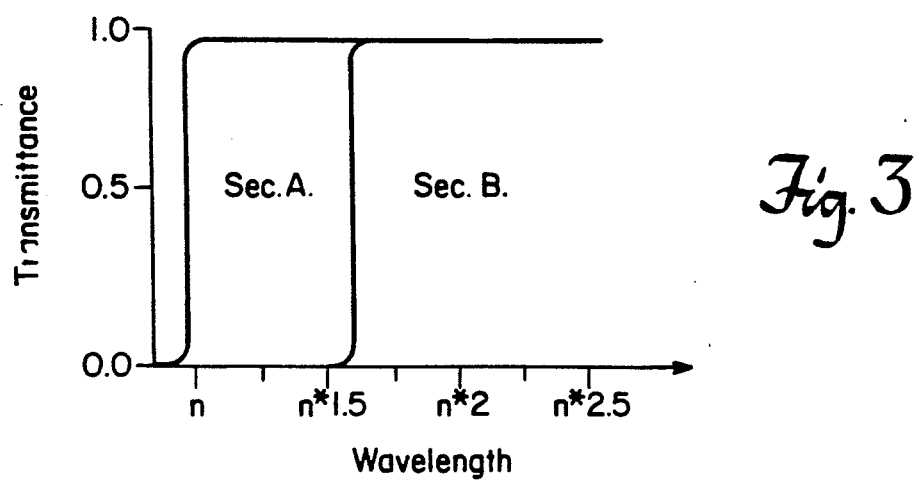
FIG. 3 shows a representative transmission of a step filter.

The step order sorting filter can have 1 to several steps so that multiple grating orders are provided equal to the number of steps in the filter. The presence of overlapping orders when the observable wave-length content of the source causes ($n_1\lambda_1^{max} = n_2\lambda_2^{min}$ to be satisfied) is a potential problem with gratings, hence the need for blocking out the shorter wavelengths of the next higher grating order and when the range of wavelengths of the source exceeds an octave. For example, $\lambda_1^{min} \approx 1.0\mu$ and $\lambda_1^{max} \approx 2.5\mu$, $\approx_2^{min} = 1.0\mu$ falls on top of $\lambda_1 = 2.0\mu$ (i.e. $1 + 2.0\mu = 2 + 1.0\mu$) Thus, one must be careful to distinguish between orders and wave-lengths within the range of incident light. FIG. 6 shows the case where $\Delta\lambda$ of source is less than an octave, hence $n_i\lambda_i = n_j\lambda_j$ is not satisfied and no blocking filter is required. The step order sorting filter is positioned before the detector to further reduce interference by higher orders of the wave length range of the source should the wave length range cause overlap of the grating orders. Such overlap can be expected in the wave length range greater than one octave as is often the case in observing near infrared light. Any conventional step order sorting filter can be utilized. A two step order sorting filter is shown having a first step formed of component 30 and a second step formed of components 30 and 32. The steps are offset from each other as shown in FIG. 2 usually a distance of a few mm. so that light passing through each step strikes the detector 22 to produce multiple grating orders including a first order set 34 and a second order set 36 which can be read independently depending upon the particular area of the detector which is being read within a particular time period. The components 30 and 32 are made of a transparent solid such as infrared (I R) glass, quartz or sapphire and are joined together by a transparent adhesive. As shown in FIG. 3, light having a wave length of $\lambda$ to $\lambda+1.6$ is transmitted through component 30 to the extent shown under the curve labeled Sec. A. Light having a wavelength of $1.5\mu$ to $2.5\mu$ is transmitted through components 30 and 32 in the extent shown under the curve labeled Sec. B. Typically $\lambda$ has a value from 0.3 to 5.0 microns. Additional step components can be added to the step filter to block (or attenuate) higher grating orders. The use of a two dimensional multielement detector permits real time collection of data over the entire useful design range of the spectrometer. This greatly improves the signal to noise ratio or, for a given signal to noise ratio, permits reduction in the observation time required. A useful detector 22 is available from Rockwell International Corporation. This signal processing unit consists essentially of a plurality of integrating amplifiers and gates one for each of the photodiodes in the array detector 22. Each amplifier converts the light-induced current from a photodiode in the array into a voltage proportional to the integral with respect to time of this photodiode current and which is suitably amplified for detection. The amplified outputs are processed or recorded.

In use, light is focused by means of foreoptics 16 onto the aperture 14 of the spectrometer 10. Light from the aperture is dispersed by grating 20, filtered by means of step filter 24 and then is detected by detector 22. The output from each array element of detector 22 is integrated by processing unit 26 in the manner described.

In order to provide further understanding of this invention, a description of the grating equation and grating orders is provided below with reference to FIGS. 4, 5 and 6.

The basic grating equation may be derived by supposing a section through the grating surface normal to the ruling direction exhibits a sawtooth pattern as shown in FIG. 4. Light rays A and B, of wavelength, $\lambda$, incident on adjacent grooves at angle 1 to the grating normal are shown. Consider light at angle D to the grating normal, this light originating from the A and B rays as they strike the grating. The path difference between the A' and B' rays can be seen to be $$a \sin D + a \sin I.$$

Summing of the rays A' and B; will result in destructive interference if this path difference is equal to any odd multiple of half the wavelength, and constructive interference if the path difference is equal to any multiple of the wavelength, i.e.

$$a(\sin D + \sin I) = m\lambda.$$

where m is an integer. This is the basic grating equation, m is called the order of diffraction. Note that if I and D are on the different sides of the normal the equation is a $(\sin D - \sin I) = m\lambda$. In this discussion only two grooves have been considered. Adding in the other grooves does not change the basic equation but sharpens the peak in the plot of diffracted intensity against angle D from the sin squared intensity distribution which results from the two groove case. In general when a parallel beam of monochromatic light is incident on a grating the light is diffracted from the grating in directions corresponding to m=0, 1, 2, 3 etc. This is shown in FIG. 5. When a parallel beam of polychromatic light is incident on a grating then the light is dispersed so that each wavelength satisfies the grating equation. This is shown in FIG. 6, according to the several orders, m.

We claim:

1. A spectrometer apparatus which comprises means for focusing a light beam onto a concave holographic astigmatic grating capable of focusing light dispersed by said grating onto a flat image plane thereby to produce a reflected light beam having an interference pattern, a step order filter positioned to permit said reflected beam to be transmitted therethrough, a two-dimensional multielement array detector positioned at the focal plane of the concave grating to detect a light beam transmitted through said filter and to produce a detected signal and means for reading said detected signal.

2. The apparatus of claim 1 wherein said filter has between one and two steps.

* * * * *